(12) United States Patent
Hasumi

(10) Patent No.: US 9,573,785 B2
(45) Date of Patent: Feb. 21, 2017

(54) MANUFACTURING METHOD FOR RIDGED PAPER EJECTION ROLLER

(71) Applicant: Suncall Corporation, Kyoto-shi (JP)

(72) Inventor: Keigo Hasumi, Kyoto-fu (JP)

(73) Assignee: Suncall Corporation, Kyoto (JP)

( * ) Notice: Subject to any disclaimer, the term of this patent is extended or adjusted under 35 U.S.C. 154(b) by 173 days.

(21) Appl. No.: 14/375,390

(22) PCT Filed: Mar. 12, 2013

(86) PCT No.: PCT/JP2013/056699
§ 371 (c)(1),
(2) Date: Jul. 29, 2014

(87) PCT Pub. No.: WO2013/137210
PCT Pub. Date: Sep. 19, 2013

(65) Prior Publication Data
US 2015/0018183 A1     Jan. 15, 2015

(30) Foreign Application Priority Data
Mar. 14, 2012   (JP) ................................. 2012-056817

(51) Int. Cl.
*B65H 29/20*   (2006.01)
*B65H 29/12*   (2006.01)
(Continued)

(52) U.S. Cl.
CPC ......... *B65H 29/20* (2013.01); *B29C 45/14549* (2013.01); *B29C 59/02* (2013.01);
(Continued)

(58) Field of Classification Search
CPC ............... B29C 37/005; B29C 37/0053; B29C 37/0057; B29C 59/007; B29C 59/021; B29C 2059/027; B29C 2063/006; B29C 63/481; B29C 65/70; B29C 65/7858; B29C 65/7861; B29C 67/0003; B29C 67/0014; B29C 67/0048; B29C 31/047; B29C 31/08; B29C 31/085; B29C 43/46; B29C 43/461; B29C 43/464; B29C 39/026; B29C 44/507; B29C 47/32; B29C 59/02; Y10T 29/49549; Y10T 29/49563; B41J 13/07; B41J 13/02; B65H 29/20; B65H 27/00; B29D 99/032; B29D 99/0035
(Continued)

(56) References Cited

U.S. PATENT DOCUMENTS 545,698 A * 9/1895 Johnson ............. A22C 13/0013
                                                       264/279
1,902,573 A * 3/1933 Neidich ..................... B44C 1/26
                                                        138/140
(Continued)

FOREIGN PATENT DOCUMENTS

JP         54-106573          8/1979
JP         54106573 A *       8/1979
(Continued)

OTHER PUBLICATIONS

Office Action for Japanese Application No. 2012-056817, "Notice of Reasons for Rejection." Mailing Date: Apr. 17, 2015, 7 pages.
(Continued)

*Primary Examiner* — Jason L Vaughan
(74) *Attorney, Agent, or Firm* — Sterne, Kessler, Goldstein & Fox P.L.L.C.

(57) ABSTRACT

A ridged paper ejection roller according to the present invention conveys a paper sheet in cooperation with a plurality of star wheels disposed apart from each other in a width direction of the paper sheet, and includes a rigid main shaft body and a resin body coated on the main shaft body. The resin body integrally includes a plurality of large
(Continued)

diameter-regions that work in conjunction with the respective star wheels to hold therebetween and convey the paper sheet, and small-diameter regions other than the large-diameter regions.

4 Claims, 5 Drawing Sheets

(51) Int. Cl.
  *B29C 45/14*  (2006.01)
  *B29C 59/02*  (2006.01)
  *B41J 13/076*  (2006.01)
  *B29K 55/02*  (2006.01)
  *B29K 69/00*  (2006.01)
  *B29K 705/12*  (2006.01)
  *B29L 31/00*  (2006.01)

(52) U.S. Cl.
  CPC .......... *B41J 13/076* (2013.01); *B65H 29/125* (2013.01); *B29C 2059/027* (2013.01); *B29K 2055/02* (2013.01); *B29K 2069/00* (2013.01); *B29K 2705/12* (2013.01); *B29L 2031/767* (2013.01); *B65H 2401/115* (2013.01); *B65H 2402/80* (2013.01); *B65H 2404/133* (2013.01); *B65H 2404/141* (2013.01); *B65H 2801/06* (2013.01)

(58) Field of Classification Search
  USPC .... 492/30, 33, 36, 56, 59; 29/895.3, 895.31, 29/895.32; 264/162, 279
  See application file for complete search history.

(56) References Cited

U.S. PATENT DOCUMENTS

| | | | | |
|---|---|---|---|---|
| 1,994,062 | A * | 3/1935 | Bonanno | H01R 43/08 264/162 |
| 2,770,014 | A * | 11/1956 | Koerner | B26D 1/00 264/162 |
| 3,467,742 | A * | 9/1969 | Shobert | B29C 70/545 264/151 |
| 3,785,900 | A * | 1/1974 | Gras | A43B 1/0027 156/209 |
| 4,469,645 | A * | 9/1984 | Eigenmann | B29D 11/00615 156/279 |
| 7,481,590 | B2 | 1/2009 | Takagi | |
| 2002/0060423 | A1 | 5/2002 | Shibabuki | |
| 2004/0058129 | A1* | 3/2004 | Bouic | B05B 15/0456 428/156 |
| 2004/0109984 | A1* | 6/2004 | Bouic | B05B 15/0456 428/156 |
| 2013/0161869 | A1* | 6/2013 | Yamamoto | G03F 7/0002 264/293 |
| 2014/0232037 | A1* | 8/2014 | Kreindl | G03F 7/0002 264/219 |

FOREIGN PATENT DOCUMENTS

| | | |
|---|---|---|
| JP | 03-130247 | 12/1991 |
| JP | 07-107235 | 4/1995 |
| JP | 3023877 | 4/1996 |
| JP | 2001-310362 | 11/2001 |
| JP | 2002-154698 A | 5/2002 |
| JP | 2002-316741 A | 10/2002 |
| JP | 2003-292189 A1 | 10/2003 |
| JP | 2004-167780 | 6/2004 |
| JP | 2007-008659 A | 1/2007 |
| JP | 2007-8661 A | 1/2007 |
| JP | 2009-286616 A | 12/2009 |
| JP | 2010-184810 A | 8/2010 |

OTHER PUBLICATIONS

International Preliminary Report on Patentability; International Application No. PCT/JP2013/056699; Mar. 12, 2013.
Office Action for Chinese Application No. 201380004644.1, "First Notification of Reason(s) for Rejection." Mailing Date: Jul. 1, 2015, 9 pages.

* cited by examiner

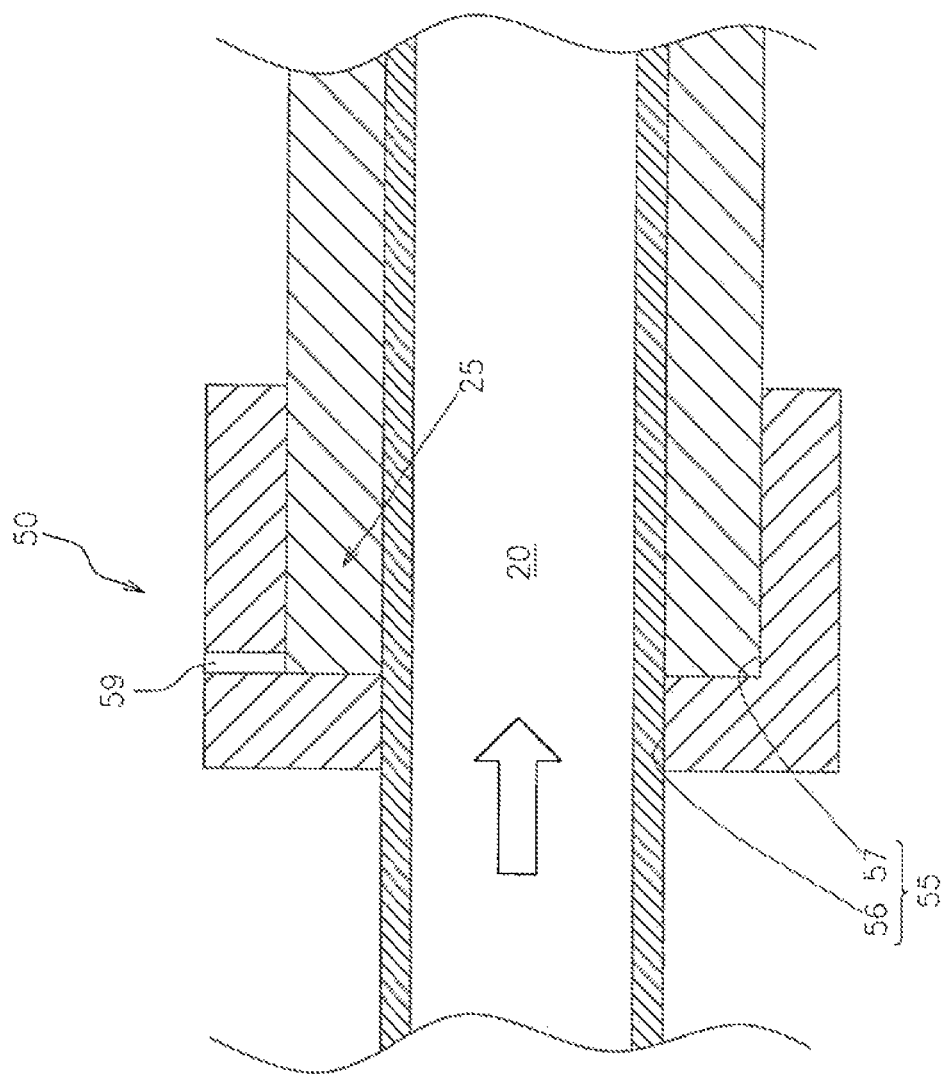

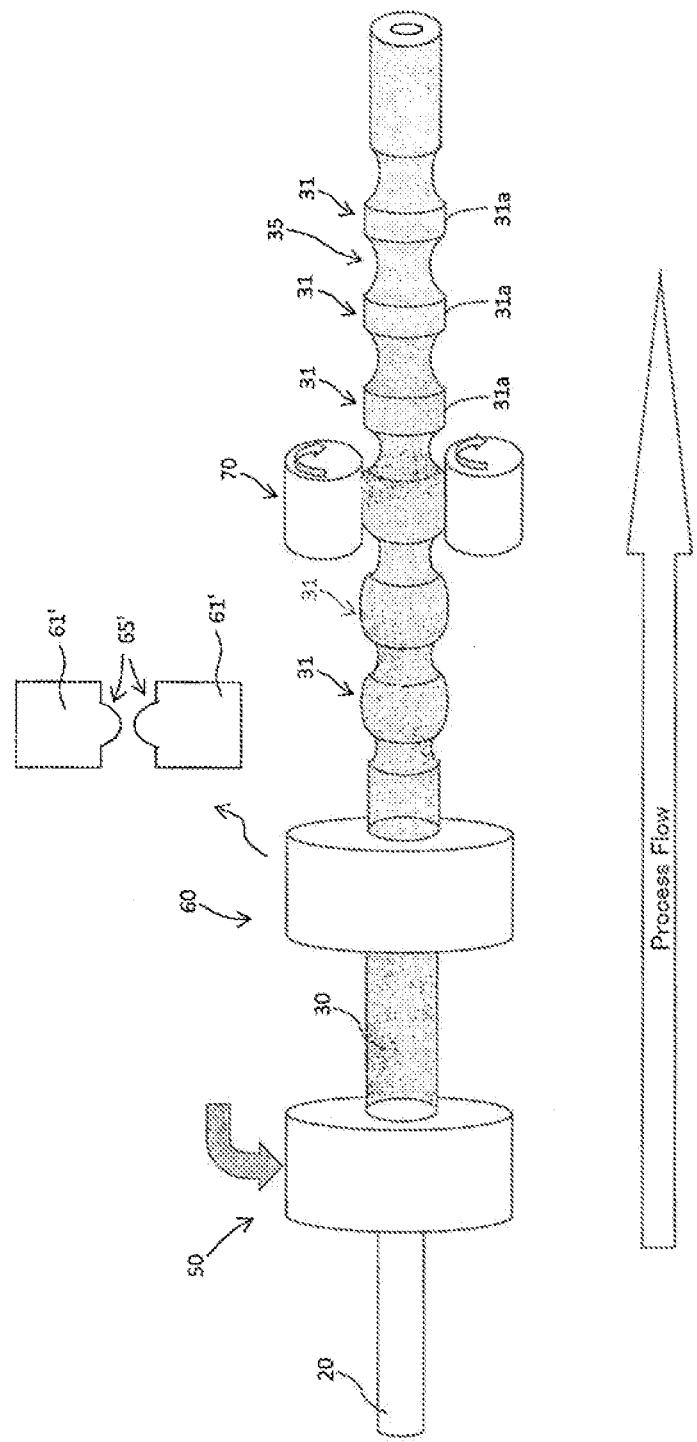

MANUFACTURING METHOD FOR RIDGED PAPER EJECTION ROLLER

FIELD OF TEE INVENTION

The present invention relates to a ridged paper ejection roller for use in a paper conveying mechanism in, for example, printers and facsimiles, and to a manufacturing method therefor.

BACKGROUND ART

A structure, in which a paper ejection roller and a star wheel (spur) are disposed so as to face each other with a paper sheet to be conveyed therebetween and the paper sheet is held between and conveyed by the paper ejection roller and the star wheel, is used for a paper conveying mechanism in office automation equipment such as printers and facsimiles.

The paper ejection roller and the star wheel are positioned more toward the downstream side in the direction in which paper is conveyed than a recording means such as an ink jet head is, and it is necessary to convey the paper sheet while preventing ink, which has been printed onto the paper sheet by the recording means, from being transferred off the paper as much as possible.

In this regard, a ridged paper ejection roller has been proposed that includes a main shaft body and a plurality of rubber rings press-fitted to the main shaft body (see Patent document 1 below).

Specifically, on one side relative to the surface of a paper sheet, a plurality of star wheels are disposed apart from each other in the width direction of the paper sheet. On the other hand, the ridged paper ejection roller is disposed on the other side relative to the surface of the paper sheet, and the rubber rings are press-fitted to the main shaft body so as to face the respective star wheels. According to this configuration, the corresponding rubber rings and star wheels hold therebetween and convey the paper sheet.

This ridged paper ejection roller can substantially limit the region of the paper ejection roller that comes into contact with the paper sheet only to the rubber rings, and is advantageous in being able to, thereby, prevent ink, which has been printed onto the paper sheet, from being transferred to the paper ejection roller as much as possible. However, the rubber rings have to be press-fitted to the predetermined positions of the main shaft body so as to face the star wheels, it is thus difficult to efficiently manufacture the paper ejection roller, and there is the problem of high manufacturing costs.

PRIOR ART DOCUMENT

Patent Document

Patent document 1: Japanese Unexamined Patent Publication No. 2002-316741

DISCLOSURE OF THE INVENTION

The present invention has been achieved in view of the conventional art described above, and an object thereof is to provide a ridged paper ejection roller that holds therebetween and convey a paper sheet in cooperation with a plurality of star wheels, the ridged paper ejection roller capable of reducing a manufacturing cost as much as possible, and a manufacturing method thereof.

In order to achieve the object, the present invention provides a ridged paper ejection roller that conveys a paper sheet in cooperation with a plurality of star wheels disposed apart from each other in a width direction of the paper sheet to be conveyed, the ridged paper ejection roller including a rigid main shaft body and a resin body coated on the main shaft body, the resin body integrally including a plurality of ridges that work in conjunction with the respective star wheels to hold therebetween and convey the paper sheet, and small-diameter regions that have a smaller diameter than the ridges.

Since the resin body coated on the main shaft body integrally includes the plurality of ridges that work in conjunction with the respective star wheels to hold therebetween and convey the paper sheet, and the small-diameter regions that have a smaller diameter than the ridges, the ridged paper ejection roller according to the present invention can realize a ridged structure with a reduced cost in comparison to a conventional configuration that realize a ridged structure by press-fitting rubber rings to a main shaft body.

Preferably, an outer surface of the ridge, which faces the radially outward direction, is parallel to the axial direction of the main shaft body.

Preferably, the outer surface of the ridge, which faces the radially outward direction, is coated with a ceramic resin.

Further, the present invention provides a method for manufacturing a ridged paper ejection roller that conveys a paper sheet in cooperation with a plurality of star wheels disposed apart from each other in a width direction of the paper sheet to be conveyed and includes a rigid main shaft body and a resin body coated on the main shaft body, the resin body integrally including a plurality of ridges that work in conjunction with the respective star wheels to hold therebetween and convey the paper sheet, and small-diameter regions that have a smaller diameter than the ridges, the method including a step of injecting resin into a through-hole of a first metal die while continuously or intermittently moving the main shaft body in the axial direction so as to pass through the through-hole to provide the resin body on the outer surface of the main shaft body, and a step of forming the ridges and the small-diameter regions by a second metal die before the resin body cures.

The through-hole of the first metal die includes an upstream hole that has an inner diameter substantially the same as the outer diameter of the main shaft body and is formed in an end wall on an upstream side relative to an insertion direction of the main shaft body, and a downstream hole that has an inner diameter larger than the upstream hole and is formed in an end wall on the downstream side in the insertion direction so as be positioned adjacent to the upstream hole on the downstream side in the insertion direction.

The first metal die is also provide with an injection passage for injecting resin into a gap between the inner surface of the downstream hole and the outer surface of the main shaft body.

The second metal die includes a plurality of segments. The segments is capable of being in an assembled state so as to compress the main shaft body that has been provided with the resin body in the radially inward direction of the main shaft body and also capable of being disassembled in the radial direction of the main shaft body from the assembled state. The inner surfaces of the segments are provided with depressions or projections for pressing the resin body before curing to form the ridges.

The method the manufacturing a ridged paper ejection roller according to the present invention makes it possible to efficiently manufacture the ridged paper ejection roller, since the outer surface of the main shaft body is coated with the resin by injecting resin into the first metal die while surrounding the main shaft body by the first metal die, and then forming the plurality of ridges and the small-diameter regions in the resin body by using the second metal die before the resin body cures.

Furthermore, the present invention also provides a method for manufacturing a ridged paper ejection roller that conveys a paper sheet in cooperation with a plurality of star wheels disposed apart from each other in a width direction of the paper sheet to be conveyed and includes a rigid main shaft body and a resin body coated on the main shaft body, the resin body integrally including a plurality of ridges that work in conjunction with the respective star wheels to hold therebetween and convey the paper sheet, and small-diameter regions that have a smaller diameter than the ridges, the method including a step of injecting resin into a through-hole of a first metal die while continuously or intermittently moving the main shaft body in the axial direction so as to pass through the through-hole to provide the resin body on the outer surface of the main shaft body.

The through-hole of the first metal die includes an upstream hole that has an inner diameter substantially the same as the outer diameter of the main shaft body and is formed in an end wall on an upstream side relative to an insertion direction of the main shaft body, and a downstream hole that has an inner diameter larger than the upstream hole and is formed in an end wall on the downstream side in the insertion direction so as to be positioned adjacent to the upstream hole on the downstream side in the insertion direction.

The first metal die is also provide with an injection passage for injecting resin into a gap between the inner surface of the downstream hole and the outer surface of the main shaft body.

In the manufacturing method, the plurality of ridges and the small-diameter region are formed by reducing a moving speed of the main shaft body or stopping the main shaft body in a first state in which a ridge forming region where the ridge is to be formed faces the injection passage while increasing the moving speed of the main shaft body to be higher than that in the first state in a second state in which a remaining region other than the ridge forming region faces the injection passage, when the resin is injected into the gap through the injection passage.

The method for manufacturing a ridged paper ejection roller according to the present invention makes it possible to efficiently manufacture the ridged paper ejection roller, since the plurality of ridges and the small-diameter regions are formed in the resin body by changing the moving speed of the main shaft body relative to the first metal die at the time when the outer surface of the main shaft body is coated with the resin by injecting resin into the first metal die while surrounding the main shaft body by the first metal die.

Preferably, any one of the above various methods may further include a step of grinding the ridges after curing of the resin body such that the outer surfaces of the ridges, which face the radially outward direction, are parallel to the axial direction of the main shall body.

BRIEF DESCRIPTION OF THE DRAWINGS

FIG. 4 is a longitudinal cross-sectional side view near a first metal die that is used in the first manufacturing method.

FIG. 5 is a schematic process diagram of a second manufacturing method of the ridged paper ejection roller.

EMBODIMENT FOR CARRYING OUT THE INVENTION

Below, a preferable embodiment of the ridged paper ejection roller according to the present invention will now be described with reference to the attached drawings.

Figure 1:
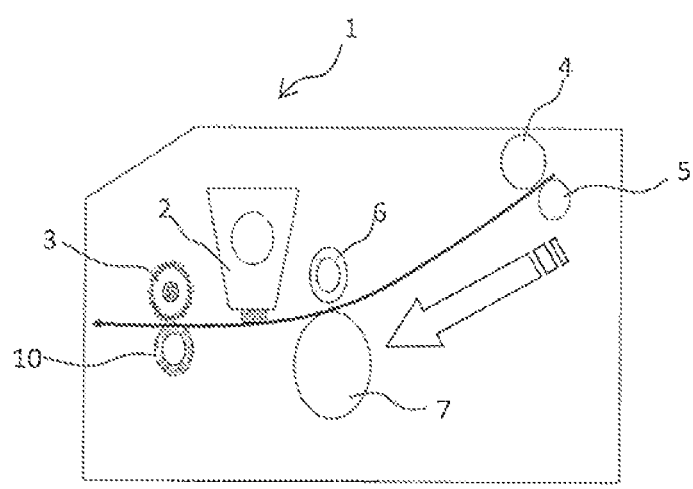
FIG. 1 is a schematic diagram of a paper conveying mechanism to which a ridged paper ejection roller according to one embodiment of the present invention is applied.

FIG. 1 shows a schematic diagram of one example of a paper conveying mechanism 1 to which a ridged paper ejection roller 10 of this embodiment is applied.

As shown in FIG. 1, the ridged paper ejection roller 10 is positioned more toward the downstream side in the direction in which a paper sheet is conveyed than an ink jet head 2 is, and is used to discharge a printed paper sheet by working in conjunction with a plurality of star wheels 3 that are disposed apart from each other in the width direction of the paper sheet.

Reference numbers 4 and 5 in FIG. 1 are a paper feed roller and a separation roller, respectively. Also, reference numbers 6 and 7 are a pinch roller and a paper delivery roller, respectively.

The star wheels 3 are disposed apart from each other in the width direction of the paper sheet on one side relative to the surface of a paper sheet to be conveyed.

On the other hand, the ridged paper ejection roller 10 is disposed on the other side relative to the surface of the paper sheet to be conveyed, so as to face the star wheels 3 with the paper sheet therebetween.

Figure 2:
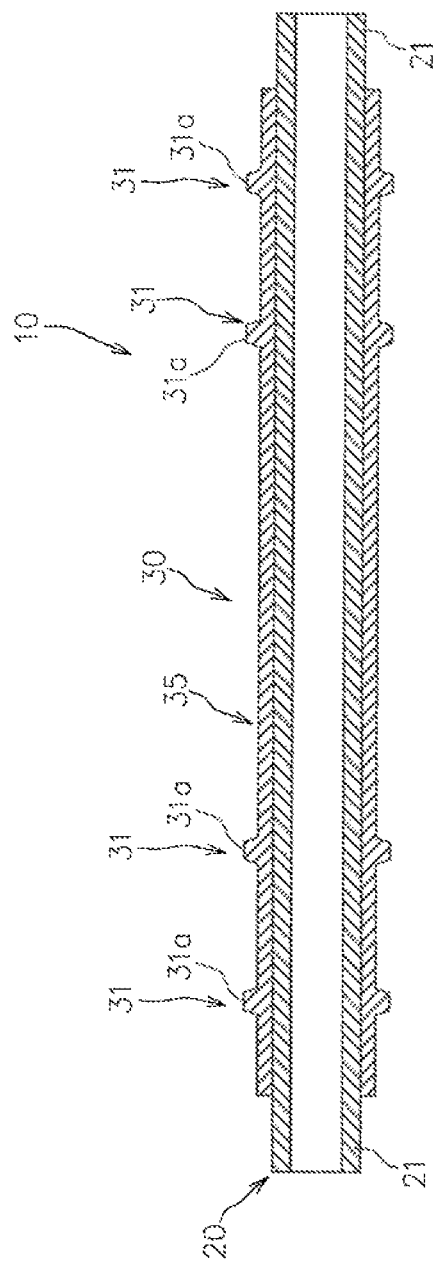
FIG. 2 is a longitudinal cross-sectional side view of the ridged paper ejection roller according to one embodiment of the present invention.

FIG. 2 shows a longitudinal cross-sectional side view of the ridged paper ejection roller 10.

As shown in FIG. 2, the ridged paper ejection roller 10 has a rigid main shaft body 20 and a resin body 30 coated on the regions of the main shall body 20 excluding at least both ends 21 that are received by bearings.

The resin body 30 integrally has a plurality of ridges 31 that are placed at the same positions as the respective star wheels 3 with respect to the positions in the axial direction of the main shaft body 20, and small-diameter regions 35 that have a smaller diameter than the ridges 31.

Each of the ridges 31 works in conjunction with the corresponding star wheel 3 to hold therebetween and convey a paper sheet.

In this way, the ridged paper ejection roller 10 according to this embodiment has the ridges 31 at positions corresponding to the star wheels 3, and regions other than the ridges 31 are the small-diameter regions 35 having a smaller diameter than the ridges 31.

It is therefore possible that the only portions of the ridged paper ejection roller 10 that come into contact with a paper sheet when conveying the paper sheet by working together with the star wheels 3 are the ridges 31, and, thereby, the influence of "deflection" that can occur to the paper sheet due to the adhesion of ink, i.e., improper conveyance of the paper sheet or occurrence of "creases" in the paper sheet, can be effectively prevented.

Furthermore, in the ridged paper election roller 10, the ridges 31 are formed integrally with the resin body 30 that is coated on the main shaft body 20.

Therefore, in comparison to conventional ridged paper ejection rollers for which ridges are formed by press-fitting rubber rings to the main shaft body 20, manufacturing efficiency can be enhanced, and manufacturing costs can be reduced.

As long as the main shaft body 20 has a predetermined rigidity, the main shaft body 20 can be formed from various materials, and preferably it can be formed from a metal material such as steel.

Moreover, the main shaft body 20 can take either a solid or hollow form, and in this embodiment, the main shaft body 20 is formed from a hollow steel pipe to save weight.

As long as the resin body 30 can be coated on the main shaft body 20, the resin body 30 can be formed from various materials. For example, acrylonitrile-butadiene-styrene resin and polycarbonate resin can be used.

Preferably, an outer surface 31*a* of the ridge 31, which faces the radially outward direction, is parallel to the axial direction of the main shaft body 20.

According to this configuration, it is easy to make the precision of the holding pressure exerted with the star wheels 3 uniform among the ridges 31, and it is thus possible to increase the precision of conveying a paper sheet.

Preferably, it is possible to provide a frictional resin layer (not shown) having a coefficient of surface friction greater than that of the resin body 30 on the outer surfaces 31*a* of the ridges 31.

Examples of resin that forms the frictional resin layer include ceramic resin, methane resin, and the like.

Providing the frictional resin layer makes it possible to stabilize conveyance of paper by the ridges 31.

Next, an example of the method for manufacturing the ridged paper ejection roller 10 will now be described.

Figure 3:
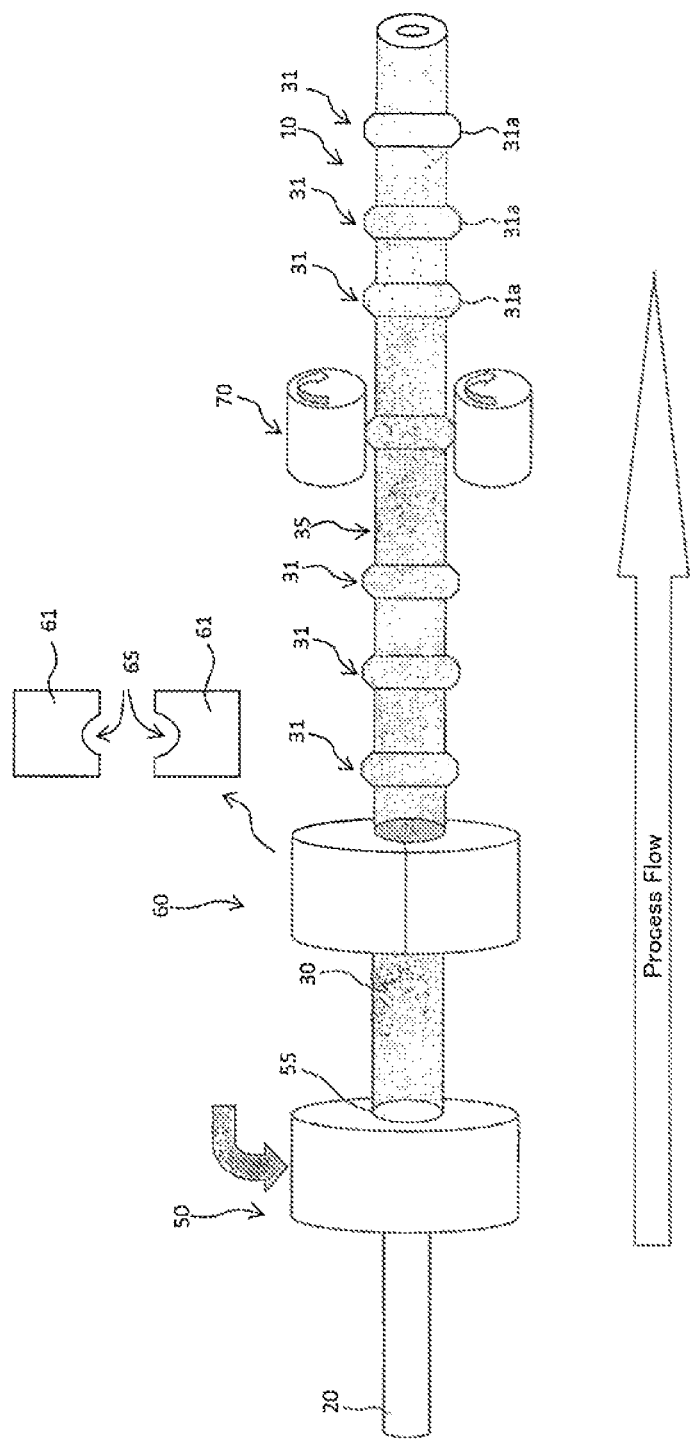
FIG. 3 is a schematic process diagram of a first manufacturing method of the ridged paper ejection roller.

FIG. 3 shows a schematic process diagram of a first manufacturing method.

As shown in FIG. 3, the first manufacturing method comprises the step of injecting resin into a through-hole 55 of a first metal die 50 while continuously or intermittently moving the main shaft body 20 in the axial direction so as to pass through the through-hole 55 to provide the resin body 30 on the outer surface of the main shaft body 20, and the step of forming the ridges 31 and the small-diameter regions 35 by a second metal die 60 before the resin body 30 cures.

FIG. 4 shows a longitudinal cross-sectional side view near the first metal die 50.

As shown in FIG. 4, the through-hole 55 of the first metal die 50 comprises an upstream hole 50 that has an inner diameter substantially the same as the outer diameter of the main shaft body 20 and is formed in an end wall on the upstream side relative to the insertion direction of the main shaft body 20 (indicated by the arrow in the figure) and a downstream hole 57 that has an inner diameter larger than the upstream hole 56 and is formed in an end wall on the downstream side in the insertion direction so as to be positioned adjacent to the upstream hole 56 on the downstream side in the insertion direction.

Moreover, in the first metal die 50, an injection passage 59 is formed for injecting resin into a gap 25 between the inner surface of the downstream hole 57 and the outer surface of the main shaft body 20.

As shown in FIG. 3, the second metal die 60 has a plurality of segments 61.

The segments 61 in an assembled state compress the main shaft body 20 that has been provided with the resin body 30 in the radially inward direction of the main shaft body 20, and can be disassembled in the radial direction of the main shaft body 20 from the assembled state.

The inner surfaces of the segments 61 are provided with depressions 65 for pressing the resin body 30 before curing to form the ridges.

According to the first manufacturing method, the resin body 30 that integrally has the ridges 31 and the small-diameter regions 35 can be efficiently provided on the outer surface of the main shaft body 20.

Preferably, the first manufacturing method can further comprise the step of grinding the ridges 31 after curing of the resin body 30 such that the outer surfaces 31*a* of the ridges 31, which face the radially outward direction, are parallel to the axial direction of the main shaft body 20.

As shown in FIG. 3, this grinding step can be performed by a grinder 70 that is disposed more toward the downstream side in the insertion direction of the main shaft body 20 than the second metal die 60 is.

Moreover, the method can further comprise the step of performing ceramic coating on the outer surfaces 31*a* facing the radially outward direction at the ridges 31 after the grinding step or, in a case where the grinding step is not performed, after curing the resin body 30 that is in a state in which the ridges 31 have been formed by the second metal die 60.

In the first manufacturing method, the segments 61, the inner surfaces of which are provided with depressions 65, are used as the second metal die 60, but it is also possible to use therefor a plurality of segments 61', the inner surfaces of which are provided with projections 65'.

FIG. 5 shows a schematic process diagram of a second manufacturing method in which the segments 61', the inner surfaces of which are provided with the projections 65, are used as the second metal die 60.

In this second manufacturing method, part of the resin body 30 is forced out in the axial direction by the projections 65 to form the ridges 31.

Moreover, in the first and second manufacturing methods shown in FIGS. 3 and 5, respectively, the ridges 31 are formed by metal die molding as described above, but it is also possible to form the ridges 31 without using a metal die.

Here, a third manufacturing method in which the ridges 31 are formed without using a metal die will now be described.

The third manufacturing method is the same as the first and second manufacturing methods in that the resin body 30 is provided on the main shaft body 20 using the first metal die 50.

Specifically, the third manufacturing method also comprises the step of providing the resin body 30 on the outer surface of the main shaft body 20 by injecting resin into the through-hole 55 while moving the main shaft body 20 in the axial direction through the through-hole 55 of the first metal die 50.

However, in the third manufacturing method, the ridges 31 and the small-diameter regions 35 are formed by changing the speed of moving the main shaft body 20 when injecting resin into the gap 25 via the injection passage 59.

Specifically, the main shaft body 20 is continuously or intermittently moved through the through-hole 55 at a predetermined speed. And, while continuously or intermittently moving the main shaft body 20 through the through-hole 55, resin is injected via the injection passage 59 to thus coat the outer surface of the main shaft body 20 with the resin body 30.

Here, the thickness of the resin body 30 can be adjusted by the speed of moving the main shaft body 20.

That is to say, when the speed of moving the main shaft body 20 is such a speed that the grip 25 between the inner surface of the downstream hole 57 and the outer surface of the main shaft body 20 can be completely filled with the resin injected via the injection passage 59, the thickness of the resin body 30 is defined by the inner diameter of the downstream hole 57.

Therefore, in a state (ridge forming state) in which a region (a ridge forming region) where the ridge 31 is to be formed faces the injection passage 59, the thickness of the resin body 30 in the ridge forming region is increased by reducing the speed of moving, or stopping, the main shaft body 20, and the ridge 31 is thus formed, and, on the other hand, in a state in which a remaining region other than the ridge forming region faces the injection passage 59, the speed of moving the main shaft body 20 is increased to be higher than that in the ridge forming state to reduce the thickness of the resin body 30 in said remaining region, and thus the small-diameter region 35 can be formed.

DESCRIPTION OF THE REFERENCE NUMERALS 3 star wheel
10 ridged paper ejection roller
20 main shaft body
25 gap
30 resin body
31 ridge
31a outer surface of ridge
35 small-diameter region
50 first metal die
55 through-hole
56 upstream hole
57 downstream hole
59 injection passage
60 second metal die
61, 61' segment
65 depression
65' projection

The invention claimed is:

1. A method for manufacturing a ridged paper ejection roller that conveys a paper sheet in cooperation with a plurality of star wheels disposed apart from each other in a width direction of the paper sheet to be conveyed and includes a rigid main shaft body and a resin body coated on the main shaft body, the resin body integrally including a plurality of ridges that work in conjunction with the respective star wheels to hold therebetween and convey the paper sheet, and small-diameter regions that have a smaller diameter than the ridges, the method comprising,
  (a) a step of injecting resin into a through-hole of a first metal die while continuously or intermittently moving the main shaft body in the axial direction so as to pass through the through-hole to provide the resin body on the outer surface of the main shaft body, and
  (b) a step of forming the ridges and the small-diameter regions by a second metal die before the resin body cures,
  (c) wherein the through-hole of the first metal die includes an upstream hole that has an inner diameter substantially the same as the outer diameter of the main shaft body and is formed in an end wall on an upstream side relative to an insertion direction of the main shaft body, and a downstream hole that has an inner diameter larger than the upstream hole and is formed in an end wall on the downstream side in the insertion direction so as to be positioned adjacent to the upstream hole on the downstream side in the insertion direction,
  (d) wherein the first metal die is provide with an injection passage for injecting resin into a gap between the inner surface of the downstream hole and the outer surface of the main shaft body, and
  (e) wherein the second metal die includes a plurality of segments, the segments capable of being in an assembled state so as to compress the main shaft body that has been provided with the resin body in the radially inward direction of the main shaft body and capable of being disassembled in the radial direction of the main shaft body from the assembled state, and
  (f) wherein the inner surfaces of the segments are provided with depressions or projections for pressing the resin body before curing to form the ridges.

2. A method for manufacturing a ridged paper ejection roller that conveys a paper sheet in cooperation with a plurality of star wheels disposed apart from each other in a width direction of the paper sheet to be conveyed and includes a rigid main shaft body and a resin body coated on the main shaft body, the resin body integrally including a plurality of ridges that work in conjunction with the respective star wheels to hold therebetween and convey the paper sheet, and small-diameter regions that have a smaller diameter than the ridges, the method comprising,
  (a) a step of injecting resin into a through-hole of a first metal die while continuously or intermittently moving the main shaft body in the axial direction so as to pass through the through-hole to provide the resin body on the outer surface of the main shaft body,
  (b) wherein the through-hole of the first metal die includes an upstream hole that has an inner diameter substantially the same as the outer diameter of the main shaft body and is formed in an end wall on an upstream side relative to an insertion direction of the main shaft body, and a downstream hole that has an inner diameter larger than the upstream hole and is formed in an end wall on the downstream side in the insertion direction so as to be positioned adjacent to the upstream hole on the downstream side in the insertion direction,
  (c) wherein the first metal die is provide with an injection passage for injecting resin into a gap between the inner surface of the downstream hole and the outer surface of the main shaft body, and
  (d) wherein the plurality of ridges and the small-diameter region are formed by reducing a moving speed of the main shaft body or stopping the main shaft body in a first state in which a ridge forming region where the ridge is to be formed faces the injection passage while increasing the moving speed of the main shaft body to be higher than that in the first state in a second state in which a remaining region other than the ridge forming region faces the injection passage, when the resin is injected into the gap through the injection passage.

3. A method for manufacturing the ridged paper ejection roller according to claim 1, further comprising a step of grinding the ridges after curing of the resin body such that the outer surfaces of the ridges, which face the radially outward direction, are parallel to the axial direction of the main shaft body.

4. A method for manufacturing the ridged paper ejection roller according to claim 2, farther comprising a step of grinding the ridges after curing of the resin body such that the outer surfaces of the ridges, which face the radially outward direction, are parallel to the axial direction of the main shaft body.

* * * * *